(12) United States Patent
Naruko et al.

(10) Patent No.: US 11,842,055 B2
(45) Date of Patent: Dec. 12, 2023

(54) DATA PROCESSING SYSTEM AND DATA COMPRESSION METHOD

(71) Applicant: Hitachi, Ltd., Tokyo (JP)

(72) Inventors: Takahiro Naruko, Tokyo (JP); Hiroaki Akutsu, Tokyo (JP); Akifumi Suzuki, Tokyo (JP); Katsuto Sato, Tokyo (JP)

(73) Assignee: HITACHI, LTD., Tokyo (JP)

( * ) Notice: Subject to any disclaimer, the term of this patent is extended or adjusted under 35 U.S.C. 154(b) by 124 days.

(21) Appl. No.: 17/642,843

(22) PCT Filed: Mar. 4, 2021

(86) PCT No.: PCT/JP2021/008346
§ 371 (c)(1),
(2) Date: Mar. 14, 2022

(87) PCT Pub. No.: WO2021/177394
PCT Pub. Date: Sep. 10, 2021

(65) Prior Publication Data
US 2022/0374156 A1   Nov. 24, 2022

(30) Foreign Application Priority Data
Mar. 6, 2020 (JP) .................. 2020-038808

(51) Int. Cl.
*G06F 3/06* (2006.01)
(52) U.S. Cl.
CPC .......... *G06F 3/0626* (2013.01); *G06F 3/0629* (2013.01); *G06F 3/0673* (2013.01)

(58) Field of Classification Search
CPC ..... G06F 3/0626; G06F 3/0629; G06F 3/0673
See application file for complete search history.

(56) References Cited

U.S. PATENT DOCUMENTS

| | | | | |
|---|---|---|---|---|
| 2003/0163328 A1* | 8/2003 | Rambo | ..................... | G06F 3/16 704/500 |
| 2004/0095477 A1* | 5/2004 | Maki | ..................... | H04N 19/14 348/222.1 |

(Continued)

FOREIGN PATENT DOCUMENTS

| | | |
|---|---|---|
| JP | 2007-199891 A | 8/2007 |
| JP | 2019-095913 A | 6/2019 |

OTHER PUBLICATIONS

Cai, et al., "End-to-End Optimized ROI Image Compression," IEEE Transactions on Image Processing, Dec. 25, 2019, vol. 29, pp. 3442-3457. (Year: 2019).*

(Continued)

*Primary Examiner* — William E. Baughman
(74) *Attorney, Agent, or Firm* — Baker Botts L.L.P.

(57) ABSTRACT

Provided is a data processing system which includes a processor and a storage device, and inputs/outputs data using a learned compander that compresses and expands data, wherein the data processing system comprises an estimation unit which uses learning data and estimates a region of interest to a data model, and a learning unit which causes the compander to learn according to an evaluation function in which each region was weighted based on the region of interest, and a result of the compander compressing and expanding the learning data.

8 Claims, 18 Drawing Sheets

(56) References Cited

U.S. PATENT DOCUMENTS

| | | | |
|---|---|---|---|
| 2007/0174536 A1 | 7/2007 | Nakagawa et al. | |
| 2019/0155684 A1 | 5/2019 | Akutsu et al. | |
| 2019/0200097 A1* | 6/2019 | Lee | H04N 21/6125 |
| 2020/0272337 A1 | 8/2020 | Akutsu et al. | |

OTHER PUBLICATIONS

International Search Report, dated May 25, 2021, for International Application No. PCT/JP2021/008346.
Cai, et al., "End-to-End Optimized ROI Image Compression," IEEE Transactions on Image Processing, Dec. 25, 2019, vol. 29, pp. 3442-3457.
Akutsu, et al., "End-to-End Learned ROI Image Compression," CVPR 2019, pp. 4321-4325.

* cited by examiner

FIG. 7

| APPLICATION NAME | AI MODEL NAME | INPUT DATA NAME |
|---|---|---|
| App1 | AI1 | DATA GENERATION SOURCE A |
| App1 | AI1 | DATA GENERATION SOURCE B |
| App1 | AI3 | DATA GENERATION SOURCE B |
| ⋮ | ⋮ | ⋮ |
| AppN | ... | ... |

APPLICATION MANAGEMENT TABLE — 132
701  702  703

FIG. 8

| AI MODEL MANAGEMENT TABLE | | | |
|---|---|---|---|
| INPUT DATA NAME | AI MODEL NAME | AI MODEL | |
| DATA GENERATION SOURCE A | AI1 | STRUCTURE, PARAMETER, ETC. OF AI1 | |
| DATA GENERATION SOURCE B | AI1 | STRUCTURE, PARAMETER, ETC. OF AI1 | |
| DATA GENERATION SOURCE B | AI3 | STRUCTURE, PARAMETER, ETC. OF AI3 | |
| ⋮ | ⋮ | ⋮ | |
| DATA GENERATION SOURCE X | ... | ... | |

FIG. 16

AI MODEL MANAGEMENT TABLE 1600

| INPUT DATA NAME | AI MODEL NAME | AI MODEL | QUALITY INDEX | AI REGION OF INTEREST QUALITY TARGET | AI REGION OF NON-INTEREST QUALITY TARGET |
|---|---|---|---|---|---|
| GENERATION SOURCE A | AI1 | AI1 | ROOT MEAN | 1.0 | 0.1 |
| GENERATION SOURCE B | AI1 | AI1 | MS-SSIM | 0.99 | 0.96 |
| GENERATION SOURCE B | AI3 | AI3 | MS-SSIM | 0.98 | 0.94 |
| ⋮ 801 | ⋮ 802 | ⋮ 803 | ⋮ 1601 | ⋮ 1602 | ⋮ 1603 |
|  |  |  |  |  |  |

DATA PROCESSING SYSTEM AND DATA COMPRESSION METHOD

TECHNICAL FIELD

The present invention generally relates to the reduction of data volume.

BACKGROUND ART

Known is a storage system which reduces the data volume (see PTL 1). This type of storage system generally reduces the data volume based on compression. As one of the existing compression methods, known is a method, such as a run-length method, of creating a dictionary of character strings with a high appearance frequency within predetermined block units, and replacing them with codes of a smaller size.

The lossy compression technique is known as a technology capable of reducing the data volume more than the lossless compression technique such as the run-length method. For example, the technology described in PTL 2 is a compression technique using a neural network as a compander. Data is compressed by modeling the regularity of data with a neural network.

CITATION LIST

Patent Literature

[PTL 1] Japanese Unexamined Patent Application Publication No. 2007-199891
[PTL 2] Japanese Unexamined Patent Application Publication No. 2019-095913

SUMMARY OF THE INVENTION

Problems to be Solved by the Invention

From the perspective of reducing the accumulation cost of data, lossy compression having a high compression ratio is required for the accumulation of large-scale data generated by IoT (Internet-of-Things) devices. Furthermore, in order to make the accumulated data available for use in a user application which uses a neural network (hereinafter referred to as "AI" (Artificial Intelligence)), the data after compression/expansion needs to satisfy the quality demanded by the AI.

In the foregoing case, deterioration in the quality based on compression is tolerated in regions other than the region that has a significant effect on the result of the AI; that is, the region of interest to the AI (hereinafter referred to as the "AI region of interest"), on a tensor configuring the data. Nevertheless, with the technology described in PTL 2, since the entire region is compressed based on roughly the same compression ratio irrespective of whether or not the region is an AI region of interest, the compression ratio will deteriorate.

The present invention was devised in view of the foregoing points, an an object of this invention is to propose a data processing system and a data compression method capable of properly reducing the data volume.

Means to Solve the Problems

In order to achieve the foregoing object, the present invention provides a data processing system which includes a processor and a storage device, and inputs/outputs data using a learned compander that compresses and expands data, wherein the data processing system comprises an estimation unit which uses learning data and estimates a region of interest to a data model, and a learning unit which causes the compander to learn according to an evaluation function in which each region was weighted based on the region of interest, and a result of the compander compressing and expanding the learning data.

With the configuration described above, since learning is performed according to the region of interest to the data model, for example, the compression ratio of regions other than the foregoing region of interest can be increased to be higher than the compression ratio of the region of interest, and the compression ratio of the data used by the data model can be improved while maintaining the operable quality of the data model.

Advantageous Effects of the Invention

According to the present invention, the data volume can be properly reduced.

BRIEF DESCRIPTION OF DRAWINGS

FIG. 7 is a diagram showing an example of the table according to the first embodiment.
FIG. 8 is a diagram showing an example of the table according to the first embodiment.
FIG. 16 is a diagram showing an example of the table according to the third embodiment.

DESCRIPTION OF EMBODIMENTS

(1) First Embodiment

Figure 1:
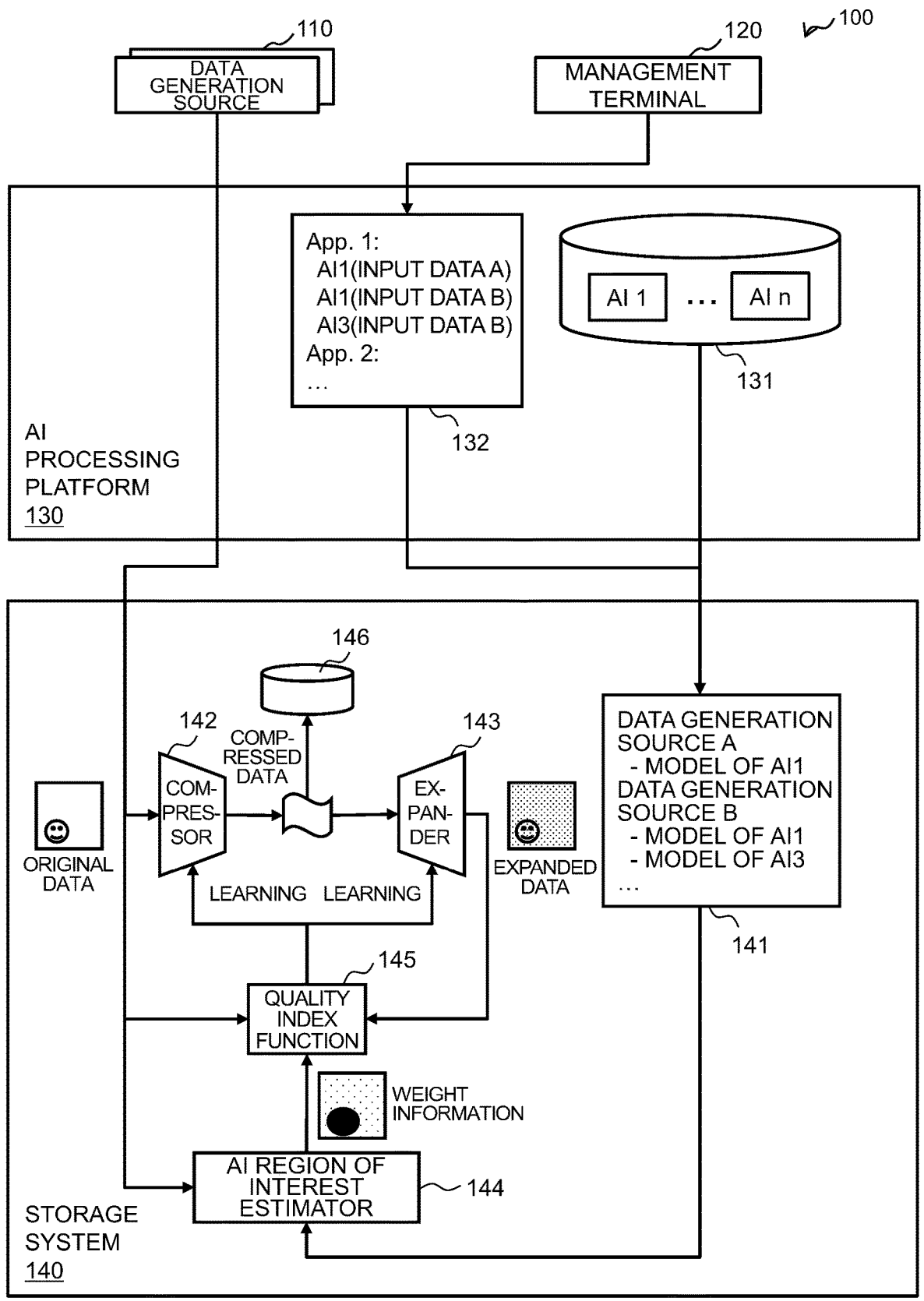
FIG. 1 is a diagram showing an example of the configuration according to the first embodiment.

This embodiment relates to the reduction of data volume. This embodiment explains a case of taking a storage system comprising a lossy compressor for AI as an example.

In conventional technologies, while it is possible to consider controlling the compression ratio according to the region, there are two major reasons that the compression ratio cannot be controlled according to the region. The first reason is that, because the AI region of interest differs for each AI, the compressor does not know according to the AI region of interest of which AI the compression ratio should be controlled. The second reason is that, even assuming that the target AI is determined, the compressor has no means for identifying the AI region of interest of the AI.

With respect to this point, since the storage system according to this embodiment can compress regions other than the AI region of interest at a high compression ratio, the compression ratio can be improved in comparison to the case of compressing the entire region at roughly the same compression ratio.

For example, the storage system of this embodiment is operated by coordinating with an AI processing platform that operates at a higher level. The AI processing platform comprises, for example, a model (structure and parameter; hereinafter referred to as the "AI model") of a neural network used in a user application, a first interface which causes a user to designate the generation source of data to become the input of the AI model (hereinafter referred to as the "data generation source"), and a first table which manages the information designated by the user, for each user application.

The storage system of this embodiment comprises, for example, a second interface which inquires information stored in the first table to the AI processing platform, and a third interface which requests the AI model.

Moreover, the storage system of this embodiment, for example, calculates the AI model in which the data becomes the input for each data generation source of the data based on the information inquired by the second interface and the third interface, and manages the correspondence relation of the data generation source and the AI model in the second table.

Moreover, the storage system of this embodiment comprises, for example, a compander using a neural network. The storage system of this embodiment sets, as a loss function of the neural network configuring the compander, a function of acquiring, from the second table, the AI model corresponding to the data generation source of the learning data of the compander, estimating the AI region of interest of the AI model in the learning data, and calculating a weighted error between the learning data before compression and the data after compression/expansion with the estimation result as the weight.

The storage system of this embodiment, for example, compresses the data by using the learned compander, and stores the compressed data in the storage drive.

According to the storage system of this embodiment, the data volume can be properly reduced.

Note that, in the following explanation, the compression ratio of data is explained as the ratio expressing the amount of information to which the compressed data was reduced in comparison to the original data as a result of compressing the data. In addition, the ratio may be expressed as a percentage (100%), or expressed as the ratio of the reduced amount of information relative to the original amount of information. Moreover, for example, a state that is compressed relatively to a small amount of information (well compressed state) may be referred to as a "high compression ratio", and a state that is compressed relatively to a large amount of information (not particularly a well compressed state) may be referred to as a "low compression ratio".

Moreover, a state in which the compression ratio is highest (for example, "0") may also be a state in which the information has been cut off.

Moreover, when the same types of elements are explained without being differentiated, the common part (part excluding the branch number) of the reference code including the branch number will be used, and when the same types of elements are explained by being differentiated, the reference code including the branch number may be used. For example, when the data generation sources are explained without being differentiated, they will be indicated as "data generation source 110", and when the individual data generation sources are explained by being differentiated, they may be indicated as "data generation source 110-1", "data generation source 110-2" and so on.

An embodiment of the present invention is now explained with reference to the appended drawings. Nevertheless, the present invention is not limited to the following embodiments.

(1-1) Overview

In FIG. 1, reference numeral 100 indicates the overall data processing system according to the first embodiment.

The data processing system 100 is configured by including a data generation source 110, a management terminal 120, an AI processing platform 130, and a storage system 140.

The data generation source 110 is one or more subjects that generate data and is, for example, a sensor, a camera, a system log or the like.

The management terminal 120 is a terminal comprising an I/O device for the AI processing platform 130 to cause the user to make various settings.

The AI processing platform 130 is a device, a system or the like for executing the AI with the data generated by the data generation source 110, and the data accumulated in the storage system 140, as the inputs.

The AI processing platform 130 comprises an AI model DB 131 and an application management table 132. The AI model DB 131 is a database (DB) for managing the AI model. The application management table 132 is a table for managing, for each user application (application program), the association of the name of the AI model to be used in the user application (hereinafter referred to as the "AI model name"), and the name of the data generation source 110 to become the input of the AI model (hereinafter referred to as the "input data name").

Note that the AI model may be initially set in the AI model DB 131 in advance, or registered by the user via the management terminal 120, or set based on the combination of the above.

The storage system 140 is a system which accumulates the data generated by the data generation source 110. The storage system 140 inquires information of the application management table 132 to the AI processing platform 130, calculates the AL model name in which the data to be accumulated becomes the input for each input data name, requests the AI model to the AI processing platform 130, and manages the correspondence relation of the input data name and the AI model in the AI model management table 141.

The storage system 140 comprises a compressor 142 and an expander 143 configured from a neural network, and learns the neural network configuring the compressor 142 and the expander 143 with the data generated by the data generation source 110 as the learning data.

The storage system 140 acquires, for each learning data, the AI model corresponding to each learning data from the AI model management table 141, and estimates the AI region of interest in the learning data by using the AI region of interest estimator 144.

The storage system 140 applies relatively high weight to the estimated AI region of interest, calculates a weighted error between the learning data and the data after the compression/expansion of the learning data by using the quality index function 145, and sets the calculated weighted error to the loss function in the learning of the neural network.

The storage system 140 compresses the data generated by the data generation source 110 with the learned compressor 142, and stores the compressed data in the storage drive 146.

(1-2) System Configuration

Figure 2:
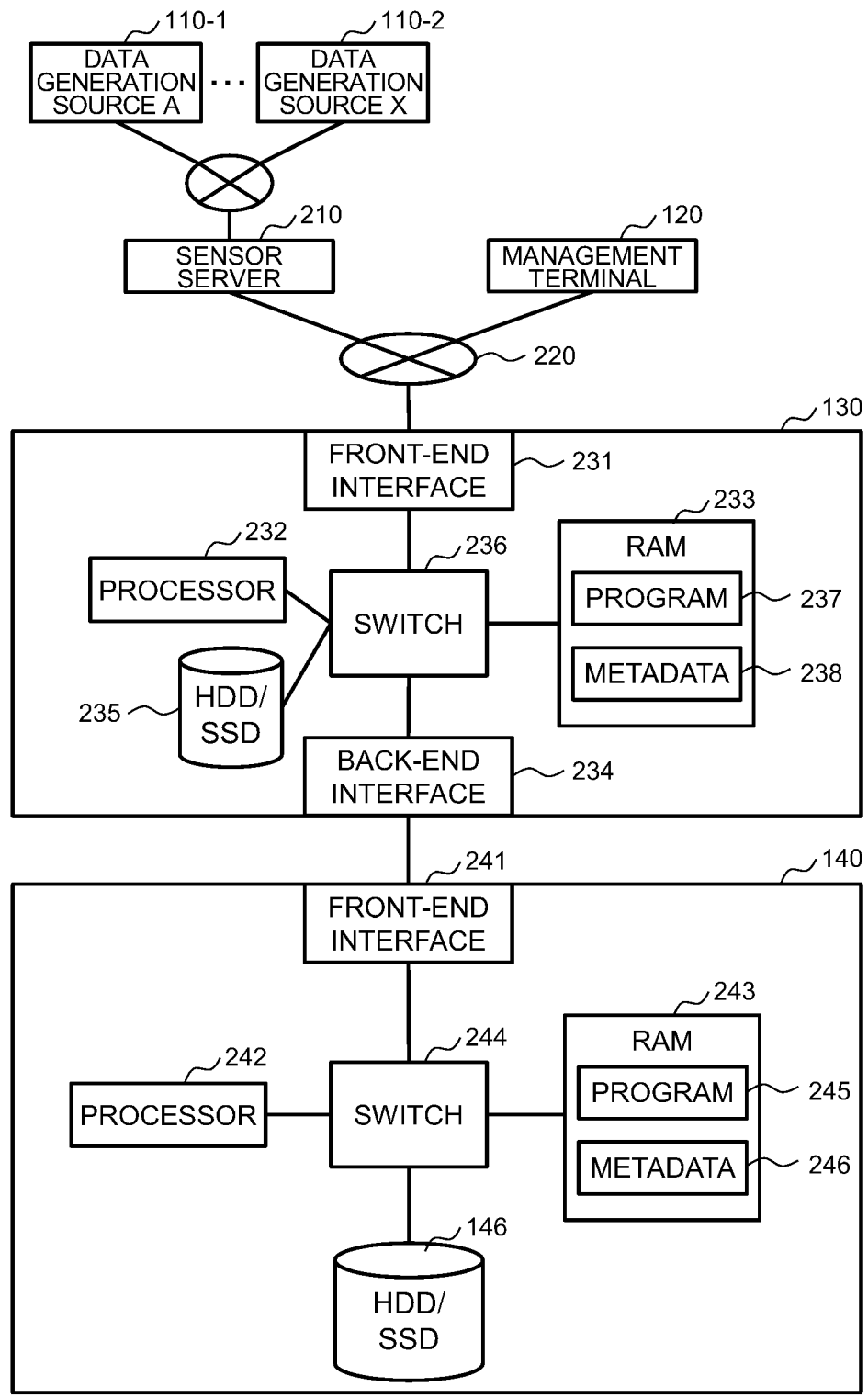
FIG. 2 is a diagram showing an example of the configuration according to the first embodiment.

The configuration of the storage system 140 is now explained with reference to FIG. 2. FIG. 2 is a diagram showing an example of the configuration of the storage system 140.

The sensor server 210 shown in FIG. 2 is a computer comprising hardware resources such as a processor, a memory, a network interface and the like, and software resources such as a driver and the like of the data generation source 110. The sensor server 210 converts the data (signals) output by the data generation source 110 into a file format such as csv (comma-separated values), binary, PNG (Portable Network Graphics) or the like, or a file format to be received by the AI processing platform 130 and the storage system 140, and requests the storage system 140 to write the converted data via the switch 220.

Note that the sensor server 210 may be a device that is different from the data generation source 110, or loaded as a function equipped in the data generation source 110. Moreover, the sensor server 210 is not limited to one sensor server 210, and may be two or more sensor servers 210.

The switch 220 connects the sensor server 210, the management terminal 120, and the AI processing platform 130.

The AI processing platform 130 comprises a front-end interface 231, a processor 232, a RAM 233 (Random Access Memory), a back-end interface 234, a storage drive 235 (HDD: Hard Disk Drive/SSD: Solid State Drive), and a switch 236.

The front-end interface 231 is an interface for connecting the AI processing platform 130 with the sensor server 210, the management terminal 120 and the like. The processor 232 controls the overall AI processing platform 130 via the switch 236 based on a program 237 and management information 238 (Metadata) stored in the RAM 233. The processor 232 may be a general-purpose arithmetic processor such as a CPU (Central Processing Unit), or otherwise may be an accelerator such as a GPU (Graphical Processing Unit) or an FPGA (Field Programmable Gate Array), or may be a combination of the above.

The back-end interface 234 connects the AI processing platform 130 and the storage system 140. The storage drive 235 is a storage device such as an HDD, an SSD or the like, and stores the AI model registered in the AI model DB 131 (structure information, parameter value and the like of the AI model).

The storage system 140 comprises a front-end interface 241, a processor 242, a RAM 243, a switch 244, and a storage drive 146 (HDD/SSD).

The front-end interface 241 connects the storage system 140 and the AI processing platform 130. The processor 242 controls the overall storage system 140 via the switch 244 based on a program 245 and management information 246 (Metadata) stored in the RAM 243. The processor 242 may be a general-purpose arithmetic processor such as a CPU (Central Processing Unit), or otherwise may be an accelerator such as a GPU or an FPGA, or may be a combination of the above. The storage drive 146 is a storage device such as an HDD, an SSD or the like, and stores the compressed version of the data generated by the data generation source 110.

The AI processing platform 130 and the storage system 140 may be of a configuration in which individual ICs (Integrated Circuits), which are loaded with the constituent elements explained above, are connected to each other, or a configuration in which some ICs are loaded by one semiconductor device as an ASIC (Application Specific Integrated Circuit), an FPGA or the like. The AI processing platform 130 and the storage system 140 may be different hardware devices, may be different VMs (Virtual Machines) running on the same computer, or different applications running on the same OS (Operating System).

(1-3) Management Screen

The management terminal 120 displays a first application registration screen 300 and/or a second application registration screen 400 on an output device connected communicably to the management terminal 120. While the information designated by the user is the same for both screens, the method of designating the information is different.

Figure 3:
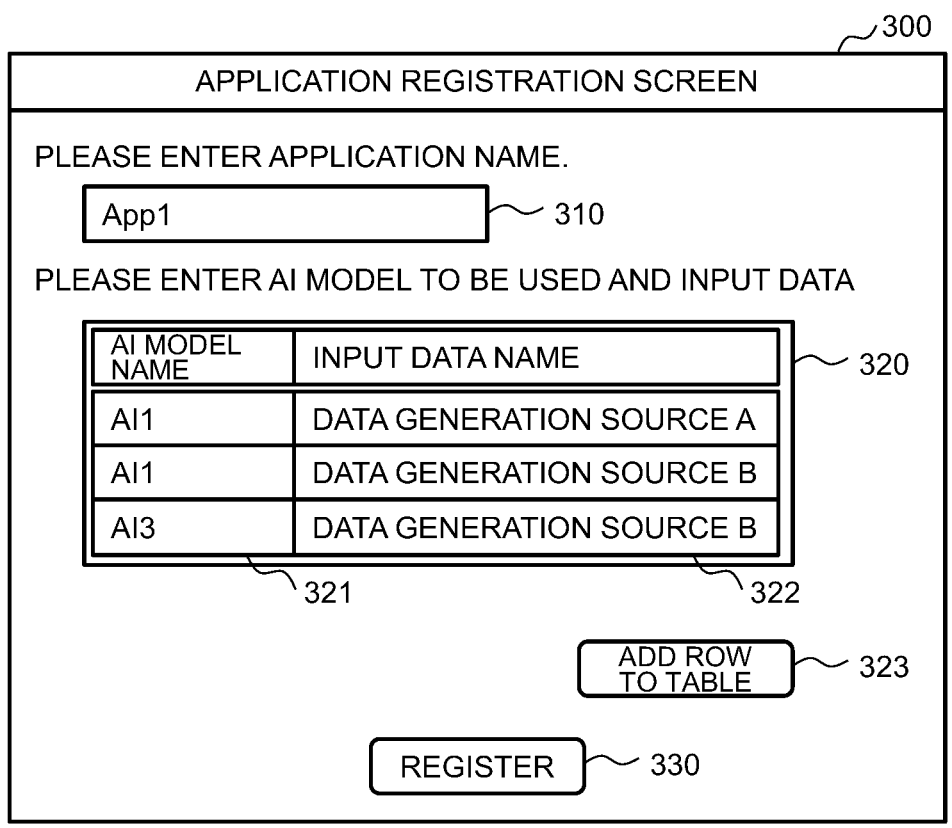
FIG. 3 is a diagram showing an example of the screen according to the first embodiment.

FIG. 3 is a diagram showing an example of the first application registration screen 300.

The application name setting field 310 is a field for causing the user to set the name of the application (hereinafter referred to as the "application name"). For example, the user is caused to designate a unique character string for identifying the application. Note that the application name setting field 310 may be omitted by the AI processing platform 130 automatically allocating a unique application name internally.

The AI setting field 320 is a field for causing the user to designate, for each AI model, the input data name of the data to become the input of the AI model. In the AI setting field 320, the AI model name designation field 321 is used for causing the user to designate the AI model name. The input data name designation field 322 is a field for causing the user to designate the input data name of the data to be used in the AI model regarding the AI model of the AI model name designated in the AI model name designation field 321 on the immediate left.

Note that, as the method of designation, the user may input a character string as described above, select a character string from a drop-down list, or use any other arbitrary means as the method of designation.

The row addition button 323 is a button to be clicked by the user when adding a new row to the end of the AI setting field 320. A sufficient number of rows may be prepared in the AI setting field 320 in advance in substitute for preparing the row addition button 323 on the first application registration screen 300.

The registration button 330 is a button to be clicked by the user upon completing the input of the application name setting field 310 and the AI setting field 320.

In addition to the fields and buttons explained above, various other fields and buttons may be added to the first application registration screen 300.

Figure 4:
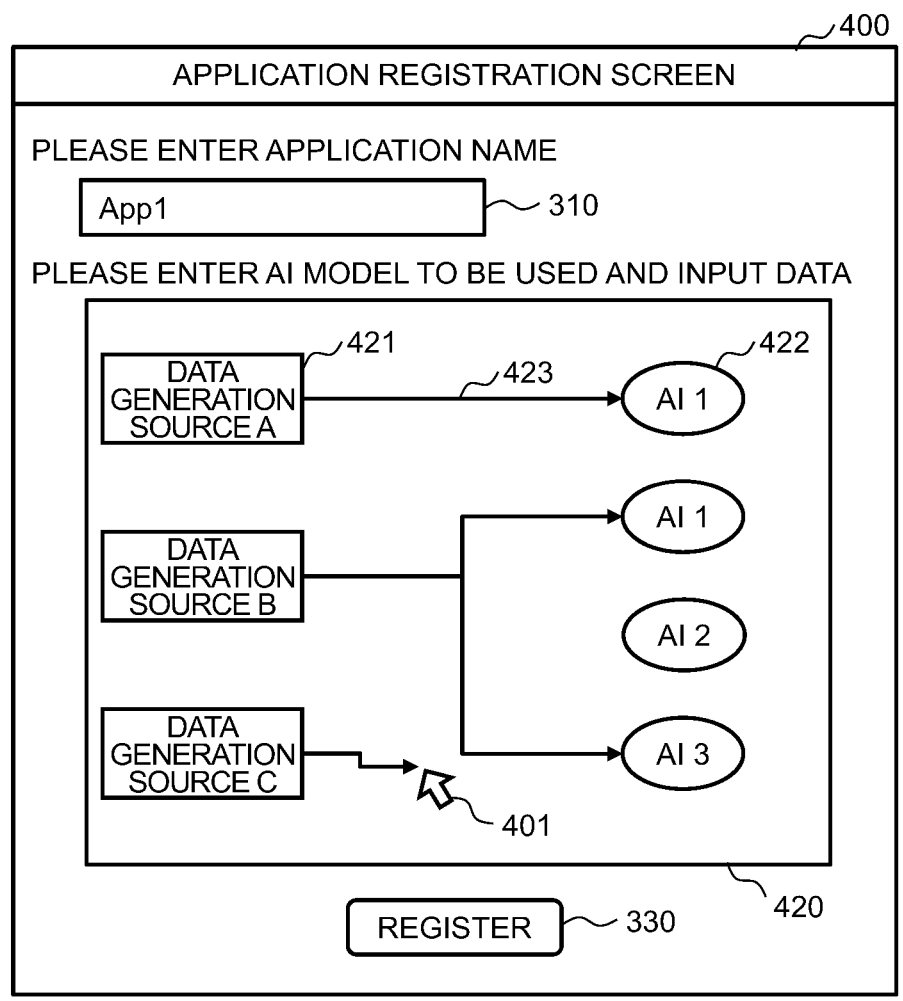
FIG. 4 is a diagram showing an example of the screen according to the first embodiment.

FIG. 4 is a diagram showing an example of the second application registration screen 400.

The application name setting field 310 and the registration button 330 shown in a second application registration screen 400 have the same functions as the first application registration screen 300.

The data flow designation field 420 is a field for causing the user to draw an edge 423 connecting an input data name node 421 representing the data generation source and an AI model name node 422 representing the AI model using a cursor 401 that can be operated with an input device of the management terminal 120.

The management terminal 120 acquires, from the drawn digraph, a correspondence relation of the AI model name and the input data name of the data used in the AI model of that AI model name. Note that the nodes that can be drawn in the data flow designation field 420 are not limited to the input data name node 421 and the AI model name node 422, and nodes representing other types of functional blocks may also be added.

In addition to the fields and buttons explained above, various other fields and buttons may be added to the second application registration screen 400.

(1-4) RAM Configuration

The main functions equipped in the data processing system 100 are explained with reference to FIG. 5 and FIG. 6, and the main information equipped in the data processing system 100 is explained with reference to FIG. 7 and FIG. 8.

Figure 5:
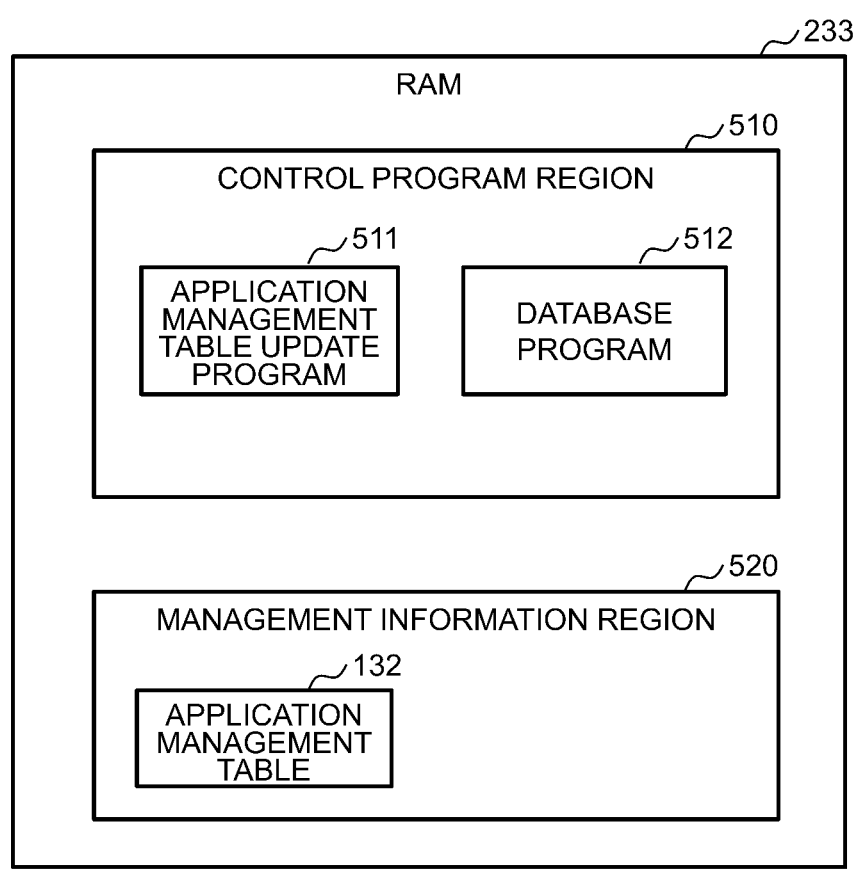
FIG. 5 is a diagram showing an example of the configuration of the RAM according to the first embodiment.

FIG. 5 is a diagram showing an example of the configuration of the RAM 233 of the AI processing platform 130.

The RAM 233 is configured by including a control program region 510 which stores the program 237 to be executed by the processor 232, and a management information region 520 which stores the management information 238 to be read and written by the processor 232 according to the program 237.

The control program region 510 includes an application management table renewal program 511, and a database program 512.

The application management table renewal program 511 is a program which causes a correspondence relation of the application name and the input data name and the AI model name designated by the user via the first application registration screen 300 and/or the second application registration screen 400 to be stored in the application management table 132.

The database program 512 is a program which provides a function and an API (Application Programming Interface) for reading and writing the AI model from and to the storage drive 235. The database is, for example, a relational database which reads and writes the AI model from and to the character string of the AI model name, but is not limited thereto. As the database, any database may be used so as long as it comprises a function and an API for reading and writing the AI model from and to the information for identifying the AI model.

The management information region 520 includes an application management table 132.

FIG. 7 is a diagram showing an example of the application management table 132.

The application management table 132 is a table which stores a correspondence relation of the application name and the input data name and the AI model name designated by the user via the first application registration screen 300 and/or the second application registration screen 400.

The application name column 701 stores an application name set in the application name setting field 310. The AI model name column 702 stores an AI model name corresponding to the AI model name designation field 321 or the AI model name node 422. The input data name column 703 stores an input data name corresponding to the input data name designation field 322 or the input data name node 421.

Each row of the application management table 132 represents that, in the application of the application name stored in the application name column 701, the AI model of the AI model name stored in the AI model name column 702 uses, as the input, the data of the data generation source 110 of the input data name stored in the input data name column 703. Note that the application management table 132 may be loaded with, in addition to tables, any type of data structure such as a hash table, a tree structure or the like.

Figure 6:
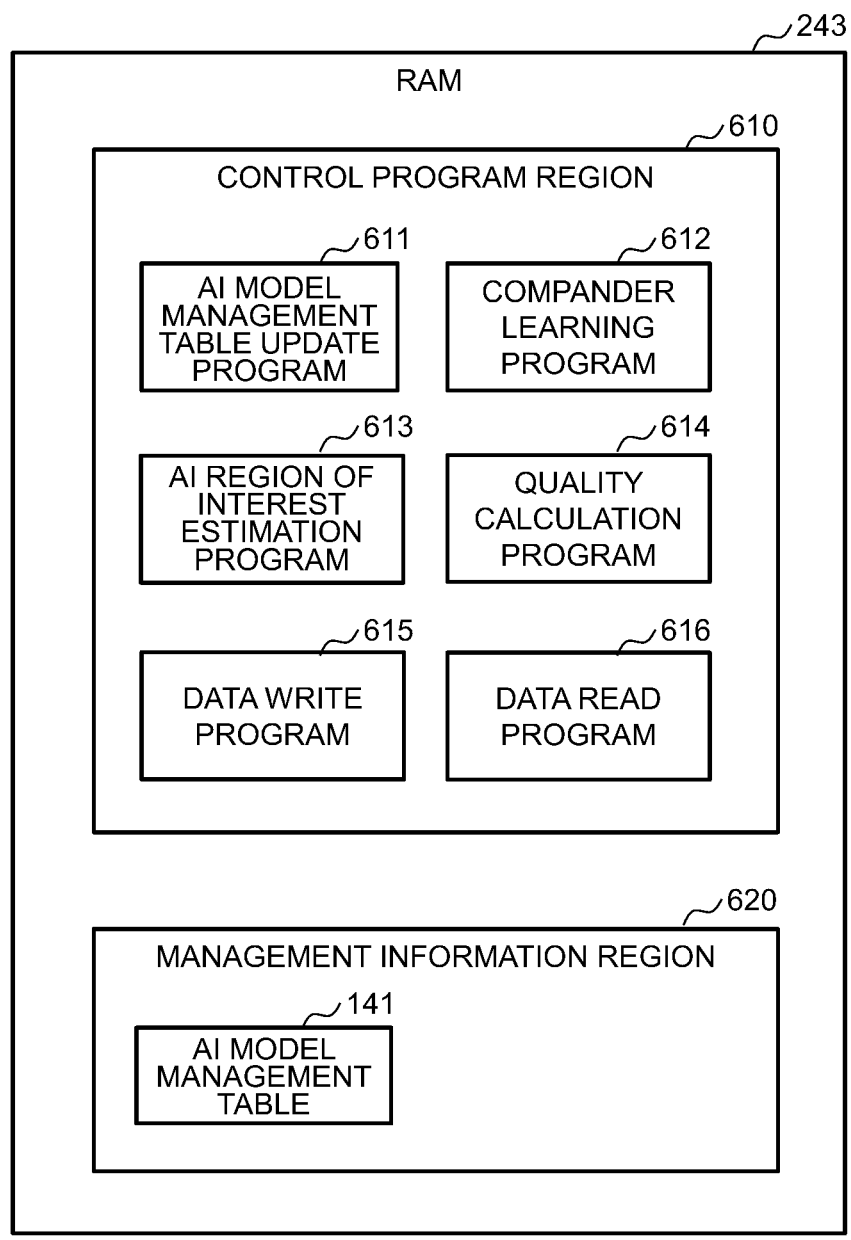
FIG. 6 is a diagram showing an example of the configuration of the RAM according to the first embodiment.

FIG. 6 is a diagram showing an example of the configuration of the RAM 243 of the storage system 140.

The RAM 243 includes a control program region 610 which stores the program 245 to be executed by the processor 242, and a management information region 620 which stores the management information 246 to be read and written by the processor 242 according to the program 245.

The control program region 610 includes an AI model management table renewal program 611, a compander learning program 612, an AI region of interest estimation program 613, a quality calculation program 614, a data write program 615, and a data read program 616.

The AI model management table renewal program 611 is a program which causes the storage system 140 to inquire information stored in the application management table 132 to the AI processing platform 130, and renew the AI model management table 141.

The compander learning program 612 is a program which learns the neural network included in the compressor 142 and the expander 143.

The AI region of interest estimation program 613 corresponds to the AI region of interest estimator 144, and is a program which estimates the AI region of interest when the data is applied to the AI of the AI model, with the AI model and the data used by the AI model as the inputs, and outputs a heat map.

The quality calculation program 614 corresponds to the quality index function 145, and is a program which outputs a weighted error based on weight information between the first data and the second data, with the first data and the second data and the weight information as the inputs. For example, this is a program which calculates, in a mean square error, an index which replaced the calculation of an average with the calculation of a weighted average. The index to be calculated by the quality calculation program 614 is not limited to the above, and may otherwise be a program which calculates a scalar value or calculates any function with the two data and the weight as the inputs.

The data write program 615 is a program which compresses the data generated by the data generation source 110 with the compressor 142, and writes the compressed data in the storage drive 146.

The data read program 616 reads the requested data from the storage drive 146 in response to the data read request, expands the read data with the expander 143, and returns the expanded data.

The management information region 620 includes an AI model management table 141. The AI model management table 141 is a table which stores, for each input data name, the AI model name in which the data of the input data name may become the input, and the AI model of that AI model name, based on the information stored in the application management table 132 of the AI processing platform 130.

FIG. 8 is a diagram showing an example of the AI model management table 141.

The input data name column 801 stores an input data name corresponding to the input data name column 703 of the application management table 132. The AI model name column 802 stores an AI model name corresponding to the AI model name column 702 of the application management table 132. The AI model column 803 stores an AI model body such as a structure, a parameter or the like of the AI model corresponding to the AI model name stored in the AI model name column 802. Note that the AI model body may be stored in the storage drive 146, and only the pointer to the AI model body may be stored in the AI model column 803.

Each row of the AI model management table 141 shows that the data of the data generation source 110 of the input data name stored in the input data name column 801 is being used as the input of the AI model of the AI model name stored in the AI model name column, and that the AI model is stored in the AI model column 803. Note that the AI model management table 141 may be loaded with, in addition to tables, any type of data structure such as a hash table, a tree structure or the like.

(1-5) Renewal Processing of Application Management Table

The processing (application management table renewal processing) of the AI processing platform 130 renewing the application management table 132 is now explained with reference to FIG. 9.

Figure 9:
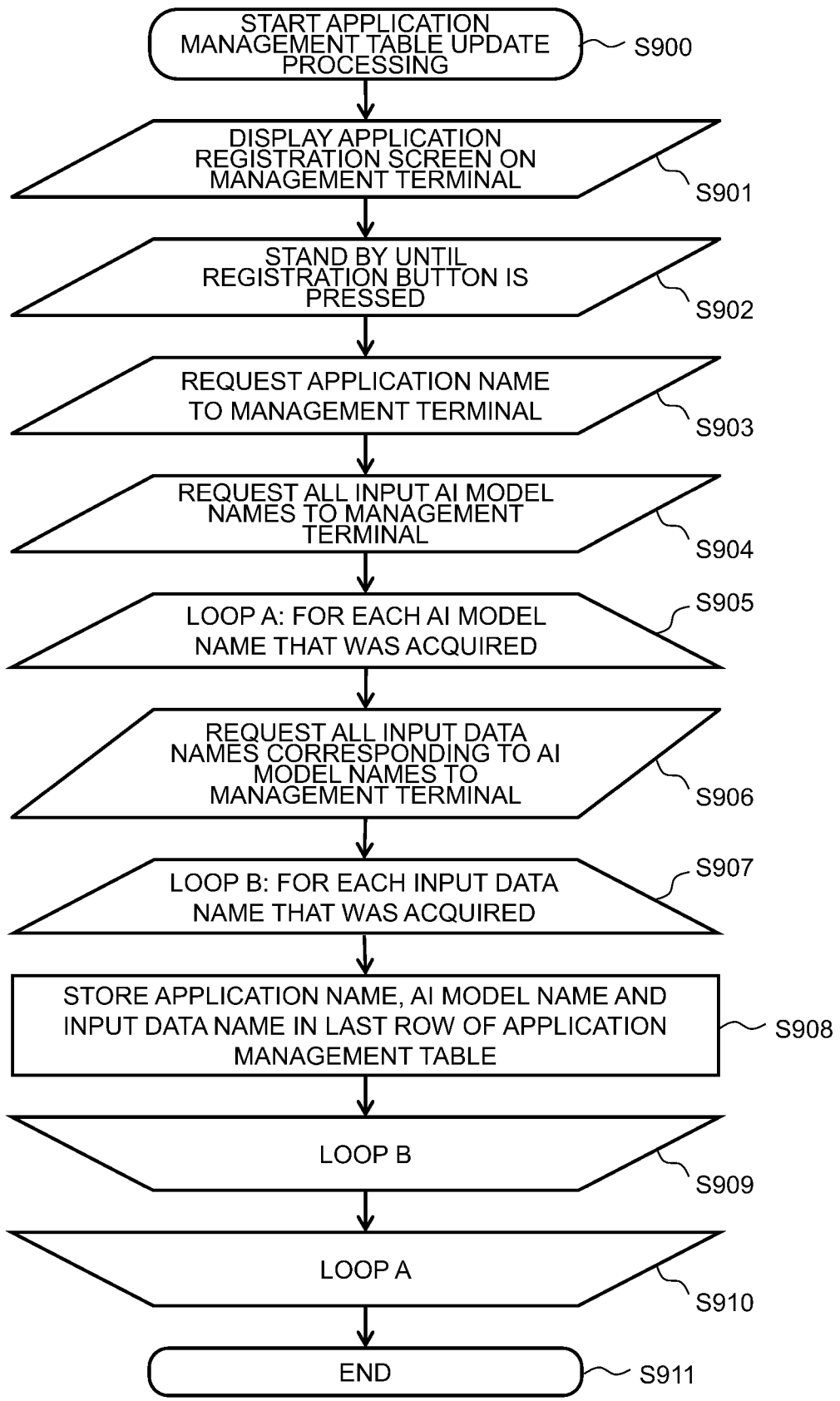
FIG. 9 is a diagram showing an example of the processing according to the first embodiment.

FIG. 9 is a diagram showing an example of the application management table renewal processing.

The processor 232 of the AI processing platform 130 may start the application management table renewal processing triggered by the user's instruction (pressing of a predetermined button), at each given time interval, or based on any other arbitrary trigger (step S900).

In step S901, the processor 232 displays the first application registration screen 300 and/or the second application registration screen 400 on an output device of the management terminal 120 via the front-end interface 231. Note that step S901 may be omitted by constantly displaying the first application registration screen 300 and/or the second application registration screen 400 on the management terminal 120.

In step S902, the processor 232 inquires a pressed state of the registration button 330 to the management terminal 120 via the front-end interface 231, and stands by until it becomes a pressed state. The processor 232 may periodically inquire a state to the management terminal 120 until a pressed state is replied, or send a message to the management terminal 120 when the registration button 330 is pressed and terminate the standby state based on the reception thereof.

In step S903, the processor 232 requests the application name designated in the application name setting field 310 to the management terminal 120 via the front-end interface 231.

In step S904, the processor 232 requests the aggregate of the AI model names designated by the AI model name designation field 321 or the AI model name node 422 to the management terminal 120 via the front-end interface 231.

Step S905 to step S910 are a step group that loops for each AI model name acquired in step S904 (loop A).

In step S906, the processor 232 requests the aggregate of the input data names of the AI model indicated by the loop A to the management terminal 120 via the front-end interface 231. The management terminal 120 extracts, among the input data names input to the input data name designation field 322 or the input data name node 421, the input data name corresponding to the AI model name designated by the processor 232, and returns the extracted input data name.

Step S907 to step S909 are a step group that loops for each input data name acquired in step S906 (loop B).

In step S908, the processor 232 respectively stores the application name acquired in step S903, the AI model name indicated by the loop A, and the input data name indicated by the loop B in the application name column 701, the AI model name column 702, and the input data name column 703 of the application management table 132.

After the loop A is ended, the processor 232 ends the application management table renewal processing (step S911).

(1-6) Renewal Processing of AI Model Management Table

The processing (AI model management table renewal processing) of the storage system 140 renewing the AI model management table 141 is now explained with reference to FIG. 10.

Figure 10:
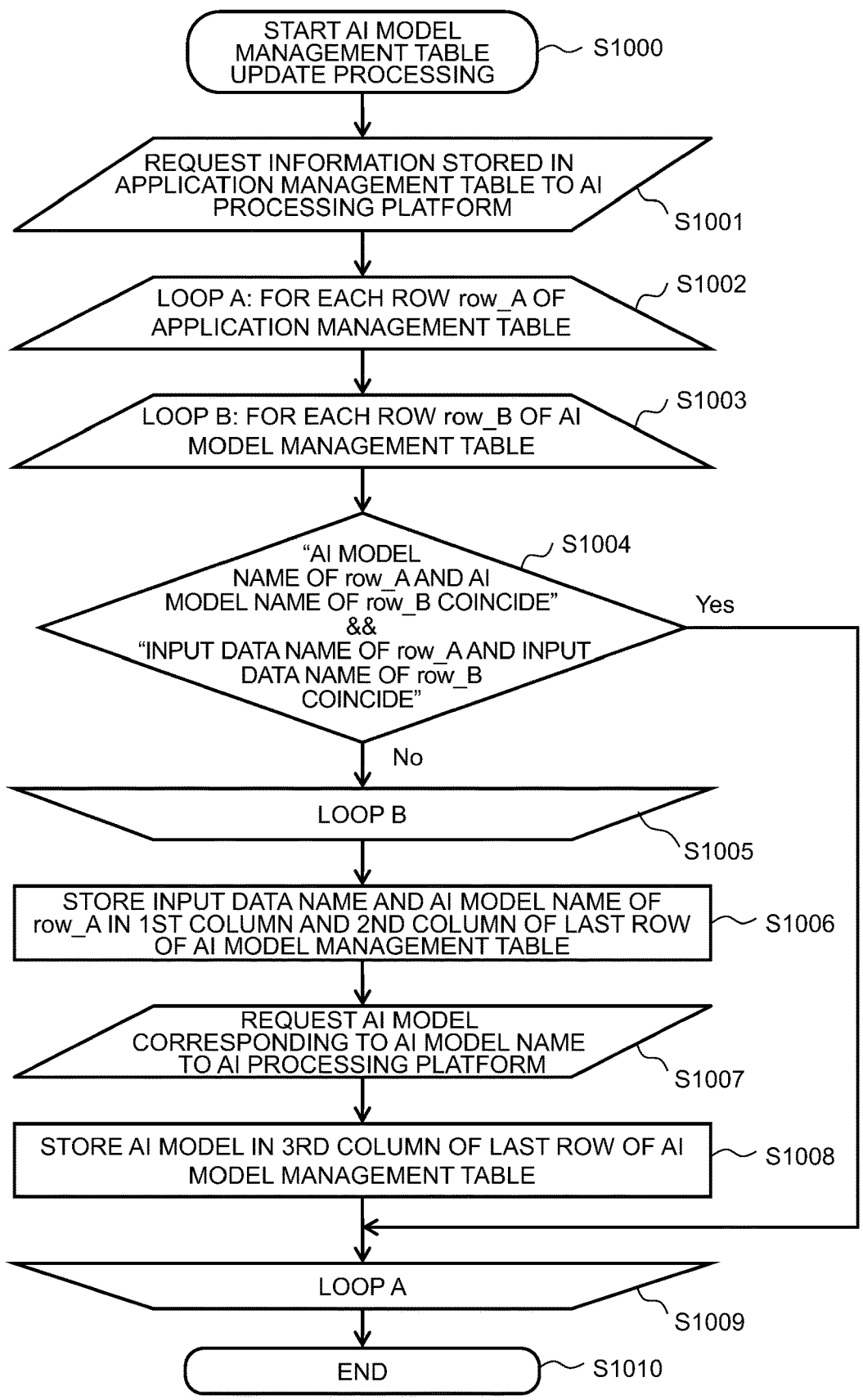
FIG. 10 is a diagram showing an example of the processing according to the first embodiment.

FIG. 10 is a diagram showing an example of the AI model management table renewal processing.

The processor 242 of the storage system 140 may start the AI model management table renewal processing triggered by the reading and writing of data, at each given time interval, triggered by the renewal of the application management table 132, or based on any other arbitrary trigger (step S1000).

In step S1001, the processor 242 requests all information stored in the application management table 132 to the AI processing platform 130 via the front-end interface 241.

Step S1002 to step S1009 are a step group that loops for each row of the application management table 132 acquired in step S1001 (loop A).

Step S1003 to step S1005 are a step group that loops for each row of the AI model management table 141 (loop B).

In step S1004, the processor 242 conditionally determines whether the AI model name of the AI model name column 702 of the row indicated by the loop A and the AI model name of the AI model name column 802 of the row indicated by the loop B coincide, and whether the input data name of the input data name column 703 of the row indicated by the loop A and the input data name of the input data name column 801 of the row indicated by the loop B coincide. When the condition is true, since the combination of the AI model name and the input data name has already been registered in the AI model management table 141, the processor 242 breaks the loop B and performs the processing of the next row of the loop A (proceeds to the next Iteration of the loop A). Meanwhile, when the condition is false, the processor 242 performs the processing of the next row of the loop B (proceeds to the next Iteration of the loop B).

When the loop B is ended without being broken in step S1004, the processor 242 executes the processing of step S1006.

In step S1006, the processor 242 respectively stores the input data name of the input data name column 703 and the AI model name of the AI model name column 702 of the row indicated by the loop A in the input data name column 801 and the AI model name column 802 of the last row of the AI model management table 141.

In step S1007, the processor 242 requests the AI model corresponding to the AI model name stored in the AI model name column 702 of the row indicated by the loop A to the AI processing platform 130 via the front-end interface 241.

In step S1008, the processor 242 stores the AI model acquired in step S1007 in the AI model column 803 of the last row of the AI model management table 141.

After the loop A is ended, the processor 242 ends the AI model management table renewal processing (step S1010).

The processing of renewing the AI model management table 141 in the storage system 140 has been explained above. In addition, adopted may be a method of renewing the replication of the AI model management table 141 in the AI processing platform 130, and copying the renewed replication to the AI model management table 141 of the storage system 140.

(1-7) Learning Processing of Compander

The processing (compander learning processing) of the storage system 140 learning the compressor 142 and the expander 143 is now explained with reference to FIG. 11.

Figure 11:
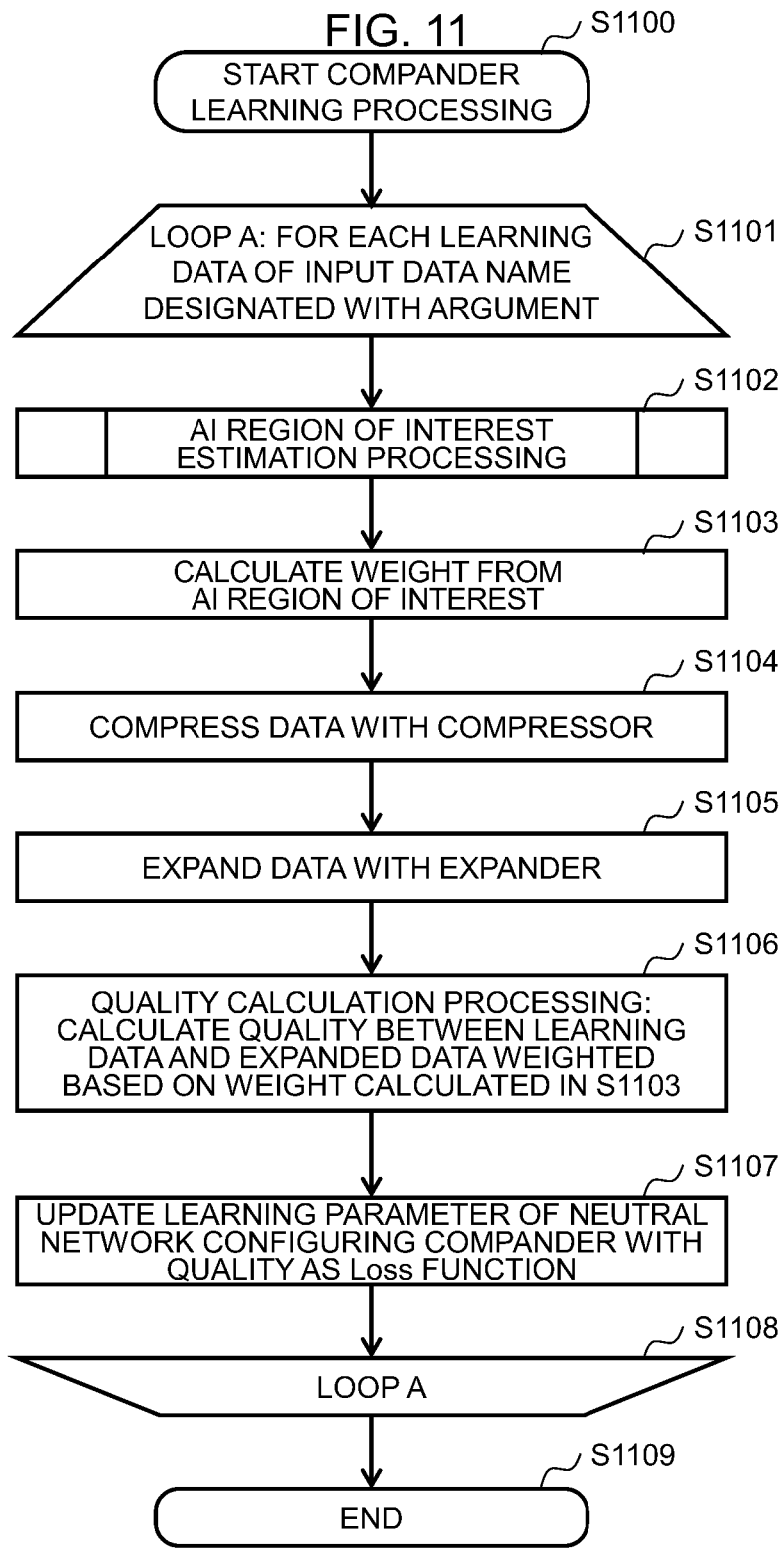
FIG. 11 is a diagram showing an example of the processing according to the first embodiment.

FIG. 11 is a diagram showing an example of the compander learning processing.

The processor 242 of the storage system 140 may start the compander learning processing triggered by the writing of data of the data generation source 110, at each given time interval, at the initialization of the storage system 140, at a timing instructed by the user via the management terminal 120, or based on any other arbitrary trigger (step S1100).

Note that, in the following explanation, described is a case of preparing the compressor 142 and the expander 143 (compander) for each data generation source 110. That is, when there are a same number of companders as the number of data generation sources 110, explained is the processing of learning the compander for one type of data generation source 110 corresponding to the input data name given as an argument of the compander learning program 612. Nevertheless, this embodiment is not limited to the foregoing case, and one compander may be learned so that the data of a plurality of data generation sources 110 are simultaneously compressed (for example, combining a plurality of data and deeming the combined data as one data), or it may be a combination thereof.

Step S1101 to step S1108 are a step group that loops for the learning data of the input data name to which the argument was given (loop A).

So as long as the learning data is similar to the data generated by the data generation source 110, it may be any data. For example, each time the data generation source 110 generates data, the compander may be learned with such data as the learning data. Moreover, for example, the compander may be learned at the initial activation of the storage system 140 with the data of the data generation source 110, which was prepared in advance as a sample, as the learning data. The granularity of the Iteration of the loop A may be in file units such as images or the like configuring the learning data, in batch units configured from a plurality of files, or any other arbitrary granularity.

In step S1102, the processor 242 activates the AI region of interest estimation program 613 as a sub routine (performs AI region of interest estimation processing). In the AI region of interest estimation processing, the processor 242 estimates the AI region of interest of the AI model that uses the learning data as the input for the learning data indicated by the loop A, and obtains the estimated result as a heat map. Note that the AI region of interest estimation processing will be explained later with reference to FIG. 12.

In step S1103, the processor 242 calculates the weight to be used as the input of the quality calculation program 614 based on the heat map of the AI region of interest calculated in step S1102. For example, the processor 242 may directly use the heat map representing the AI region of interest as the weight, binarize the value of the heat map with a suitable threshold and use the result as the weight, or otherwise calculate the weight by applying an arbitrary function to the heat map. Note that, when binarizing the value of the heat map with a threshold, the threshold and the two types of values to be set after the binarization may be the values preset in the storage system 140, or may be designated by the user via the management terminal 120.

In step S1104, the processor 242 compresses the learning data with the compressor 142, and obtains the compressed data.

In step S1105, the processor 242 expands the compressed data obtained in step S1104 using the expander 143, and obtains the expanded data.

In step S1106, the processor 242 activates the quality calculation program 614 as a sub routine, and calculates a weighted error between the learning data and the expanded data based on the weight calculated in step S1003.

For example, a mean square error weighted with the corresponding weight $w_i$ for each data point $x_i$, $y_i$ corresponding to the learning data x and the expanded data y may be used as the quality (Formula (1) below).

[Math 1]

$$d(x, y, w) = \frac{\sum_i w_i(x_i - y_i)^2}{\sum_i w_i} \qquad (1)$$

Moreover, it is also possible to use, as the quality, a formula (Formula (2) below) where a weight in which "1" is set to the AI region of interest and "0" is set to the other regions is used to calculate the mean square error of the AI region of interest and the mean square error of the other regions, a target value $t_1$ and a target value $t_2$ are subtracted for each of the above, and the values that assume "0" and max operation are added. In the foregoing case, for example, when the target value $t_1$ is set to be a value that is smaller than the target value $t_2$, once the mean square error of regions other than the AI region of interest reaches $t_2$, since the decrease of said error will no longer contribute to the decrease of the Loss function, the compander is learned to preferentially reduce the mean square error of the AI region of interest.

[Math 2]

$$d(x, y, w) = \max\left(\frac{\sum_i w_i(x_i - y_i)^2}{\sum_i w_i} - t_1, 0\right) + \max\left(\frac{\sum_i (1 - w_i)(x_i - y_i)^2}{\sum_i (1 - w_i)} - t_2, 0\right) \qquad (2)$$

As the target value $t_1$ and the target value $t_2$, the values preset in the storage system 140 may be used, or they may be designated by the user via the management terminal 120. Moreover, the method of calculating an error is not limited to the mean square error, and may otherwise be an arbitrary function which outputs a scalar value with the learning data x, the expanded data y, and the weight w as the inputs. For example, in MS-SSIM (Multi-Scale Structural Similarity) known as a quality index that is closer to human perception than the mean square error, it is also possible to add the weight w to the image data as the input in addition to images, and use, as the quality, the value calculated by replacing the calculation of the average of the Structural Similarity value in each scale with the weighted average based on the weight w. Moreover, a suitable coefficient may also be set in each term configuring Formula (2) above.

In step S1107, the processor 242 renews the learning parameter of the neural network included in the compressor 142 and the expander 143 with the weighted error calculated in step S1106 as the Loss function. For example, the processor 242 renews the learning parameter based on back propagation.

The renewal algorithm of the learning parameter is not limited to back propagation, and also used may be, for example, an algorithm such as SGD (Stochastic Gradient Descent), Adam (Adaptive moment estimation) or the like.

Moreover, there is a technology of causing the compander to learn so as to improve both the compression ratio and the quality by estimating an entropy of the compressed data with a neural network, and using a function in which the estimate value and the quality are added as the Loss function of the compander. In the foregoing case, in addition to the weighted error calculated in step S1106, added as the Loss function may be, for example, terms representing the compression ratio, and terms for regularizing the learning parameter of the neural network configuring the compander. In the foregoing case, the value obtained by adding the respective terms representing the quality, compression ratio, regularization and the like based on a predetermined constant may be used as the Loss function, or the integrated value thereof may be used as the Loss function, or otherwise an arbitrary function which calculates one scalar value from each term may be applied and used as the Loss function.

After the loop A is ended, the processor 242 ends the compander learning processing (step S1109).

Note that, until the renewal of the learning parameter is settled, the foregoing processing may be executed a plurality of times to the same learning data.

Figure 12:
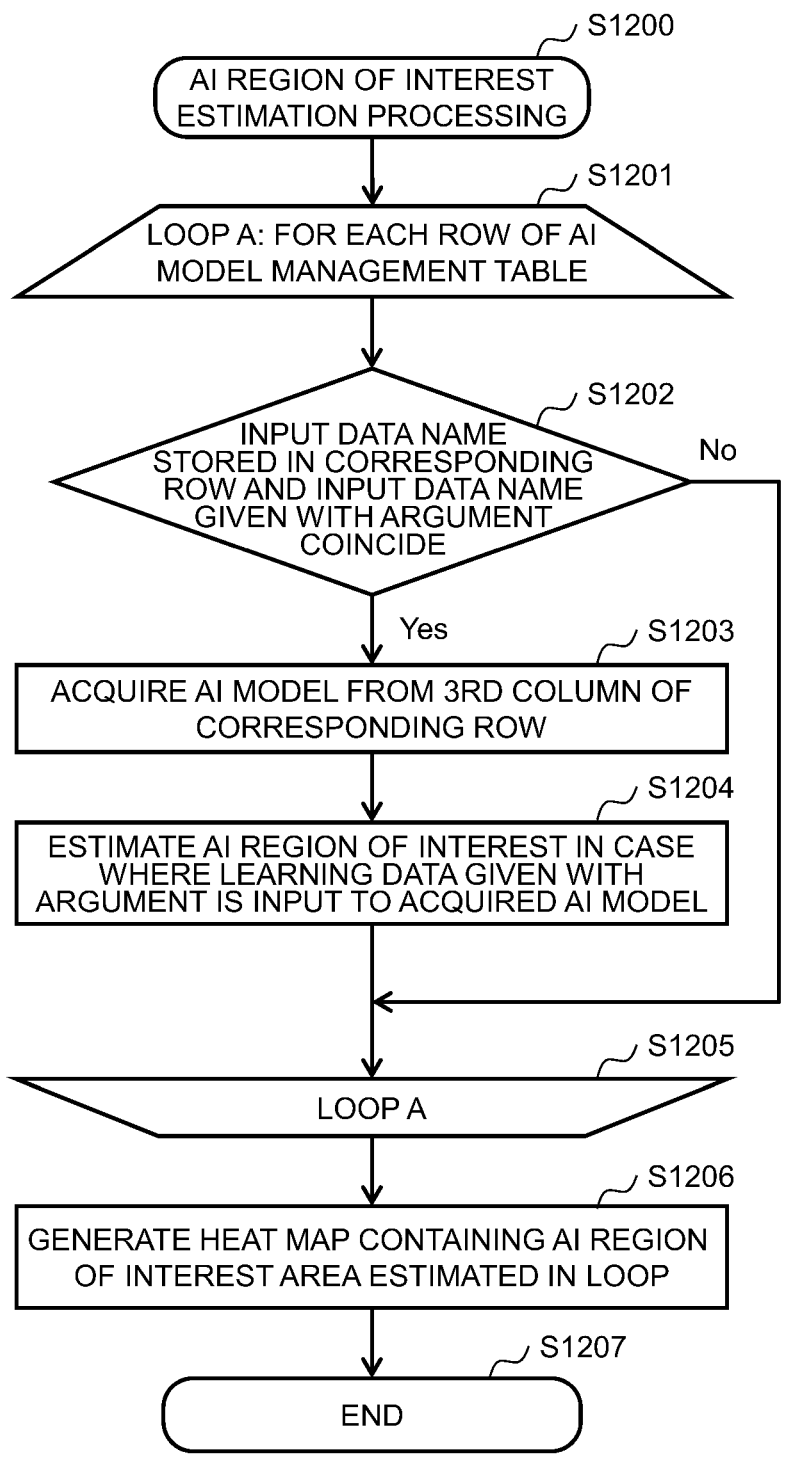
FIG. 12 is a diagram showing an example of the processing according to the first embodiment.

FIG. 12 is a diagram showing an example of the AI region of interest estimation processing.

The processor 242 starts the AI region of interest estimation processing as a sub routine of the compander learning program 612 (step S1200). Here, the processor 242 sets the learning data and the input data name of the learning data as the argument of the AI region of interest estimation processing.

Step S1201 to step S1205 are a step group that loops for each row of the AI model management table 141 (loop A).

In step S1202, the processor 242 conditionally determines whether the input data name stored in the input data name column 801 of the row indicated by the loop A and the input data name given as the argument coincide. When the condition is true, the processor 242 proceeds to the processing of step S1203. When the condition is false, the processor 242 performs the processing of the next row of the loop A (proceeds to the next Iteration).

In step S1203, the processor 242 acquires the AI model from the AI model column 803 of the row indicated by the loop A.

In step S1204, the processor 242 estimates the AI region of interest in a case where the learning data given with the argument is input to the acquired AI model.

As the estimation processing of the AI region of interest, the processor 242 executes, for example, an algorithm such as Grad-CAM, Guided Back propagation or the like. Moreover, for example, in cases where the AI model is calculating the mask internally and performing the mask processing of a feature quantity tensor, the processor 242 may use the mask as the AI region of interest. Moreover, for example, for an AI which detects a specified object with the image data as the input and outputs the position of the object in the format of Bounding Box, segmentation image or the like, the processor 242 may use the region where the object has been detected as the AI region of interest.

Note that the estimation processing of the AI region of interest is not limited to the above, and the estimation may be performed with any kind of algorithm. Moreover, the AI model is not limited to a neural network, and another machine learning algorithm such as an SVM (Support Vector Machine), or an algorithm other than machine learning may also be used.

In step S1206, the processor 242 generates a heat map containing the AI region of interest estimated in the loop A. For example, when a plurality of heat maps representing the AI region of interest are obtained from the loop A, the processor 242 calculates the maximum value of each data point, and generates a new heat map. Based on this processing, a relatively high value is set in the generated heat map in the regions that are an AI region of interest regarding one or more AI models associated with the learning data. The generation processing of the heat map is not limited to the above, and an arbitrary algorithm which calculates a heat map from the estimation result of a plurality of AI regions of interest may also be used.

After the processing of step S1206, the processor 242 ends the AI region of interest estimation processing with the heat map obtained as a result of step S1206 as the return value (step S1207).

Note that, in addition to the AI region of interest, a heat map in which a high value has also been set to a human region of interest may also be used as the return value by using a model which estimates a human point of interest.

(1-8) Data Write Processing

The processing (data write processing) of the storage system 140 writing data is now explained with reference to FIG. 13.

Figure 13:
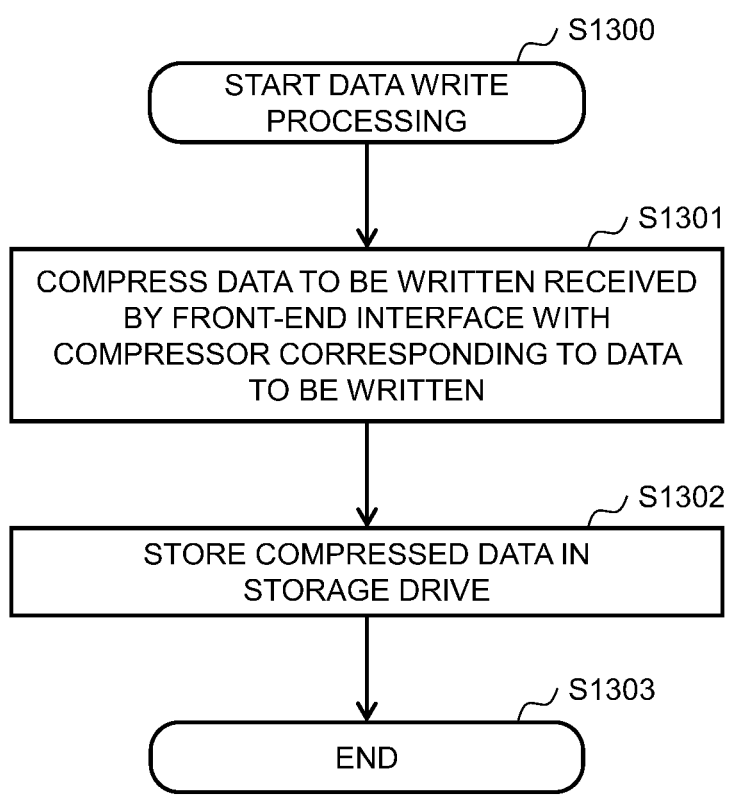
FIG. 13 is a diagram showing an example of the processing according to the first embodiment.

FIG. 13 is a diagram showing an example of the data write processing.

The processor 242 starts the data write processing triggered by the reception of a data write request by the front-end interface 241 (step S1300). Note that the path between the sensor server 210 and the storage system 140 may be a path relayed by the AI processing platform 130, or a path that directly connects the sensor server 210 and the storage system 140 as a network topology which connects the front-end interface 241 of the storage system 140 to the switch 220.

In step S1301, the processor 242 compresses the data to be written, which was received by the front-end interface 241, with the compressor 142 corresponding to the data generation source 110 of the data.

In step S1302, the processor 242 stores the compressed data in the storage drive 146. Note that the method of managing data in the storage drive 146 may be an arbitrary means such as a file system, a relational database or the like.

After the processing of step S1302, the processor 242 ends the data write processing (step S1303).

(1-9) Data Read Processing

The processing (data read processing) of the storage system 140 reading the data is now explained with reference to FIG. 14.

Figure 14:
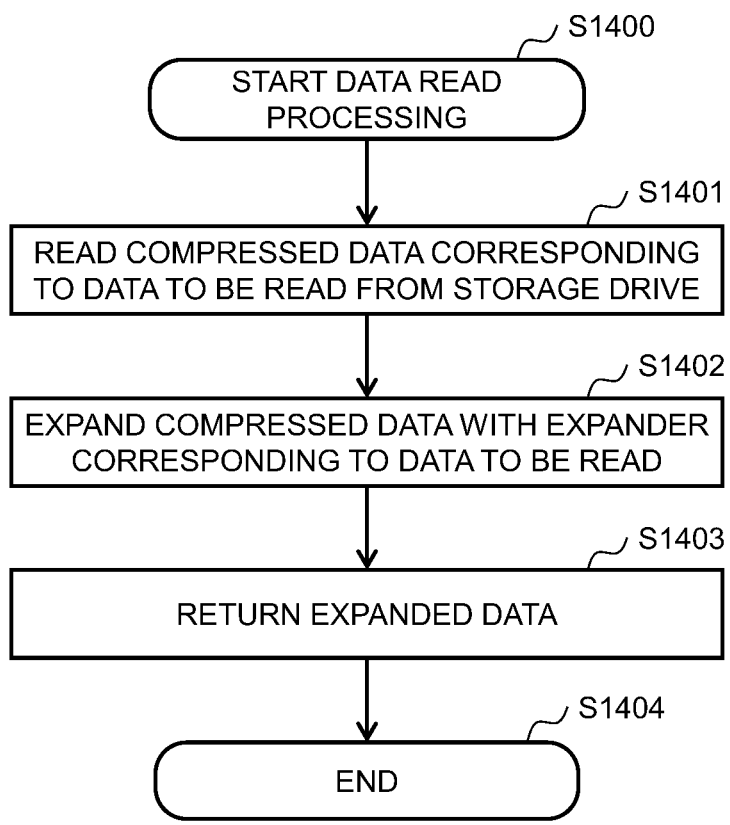
FIG. 14 is a diagram showing an example of the processing according to the first embodiment.

FIG. 14 is a diagram showing an example of the data read processing.

The processor 242 starts the data read processing triggered by the reception of a data read request by the front-end interface 241 (step S1400). Note that the data read request is issued by the management terminal 120, the AI processing platform 130 or the like. The issue subject (issue source) of the data read request is not limited to the above, and another arbitrary device may issue the data read request.

Moreover, the path between the management terminal 120 and the storage system 140 may be a path related by the AI processing platform 130, or a path that directly connects the management terminal 120 and the storage system 140 as a network topology which connects the front-end interface 241 of the storage system 140 to the switch 220.

In step S1401, the processor 242 reads, from the storage drive 146, the compressed data corresponding to the data read requested received by the front-end interface 241.

In step S1402, the processor 242 expands the compressed data read in step S1401 with the expander 143 of the data generation source 110 corresponding to the compressed data.

In step S1403, the processor 242 returns the expanded data obtained in step S1402 to the issue source of the data read request via the front-end interface 241.

After the processing of step S1403, the processor 242 ends the data read processing (step S1404).

Note that, in addition to expanding the data with the expander 143 of the storage system 140 in response to the data read request, it is also possible to return the compressed data to the issue source of the data read request, such as the management terminal 120, and cause the issue source to perform expansion processing.

According to this embodiment, the compression ratio can be improved while maintaining the operable quality of the AI.

(2) Second Embodiment

Figure 15:
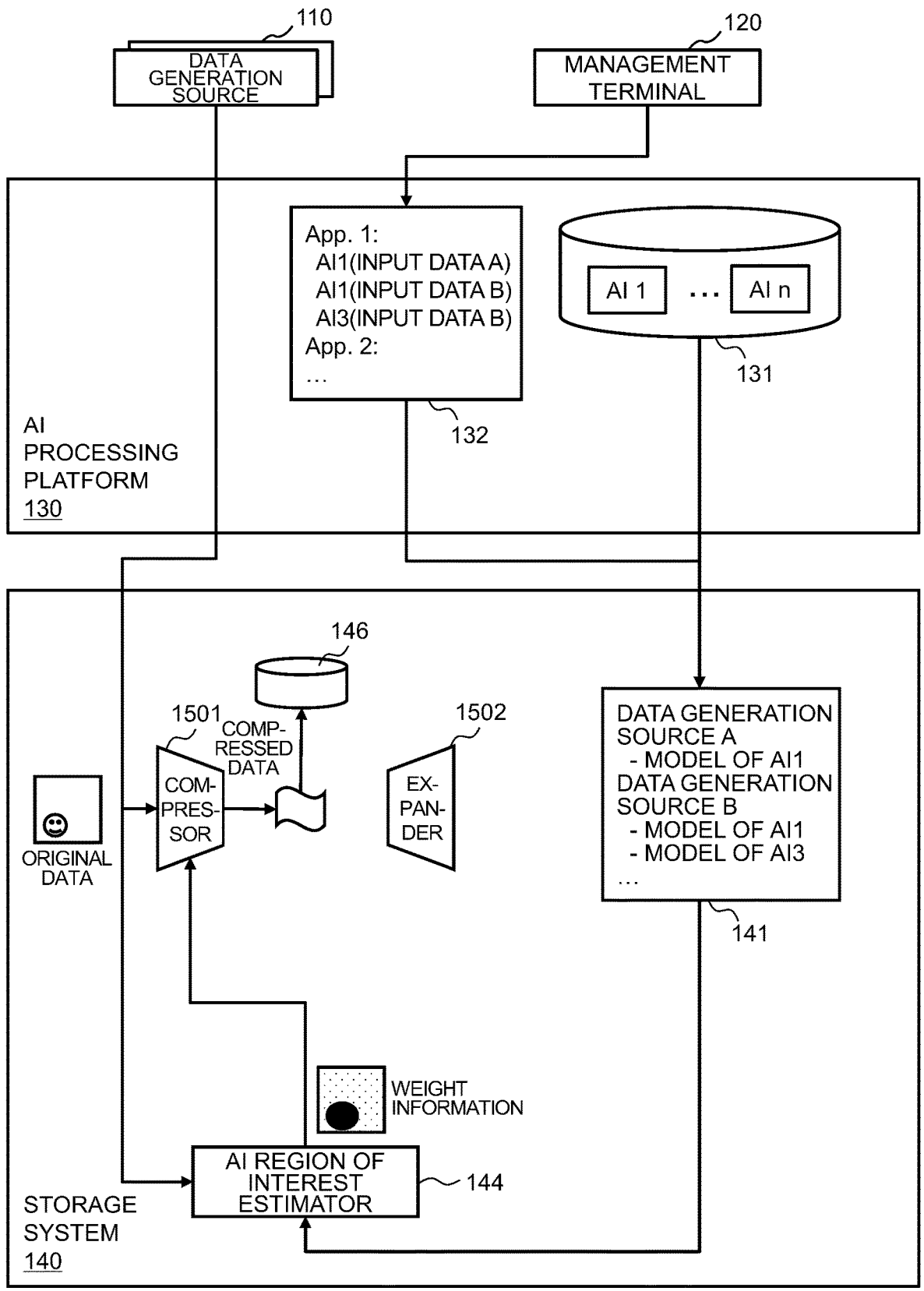
FIG. 15 is a diagram showing an example of the configuration according to the second embodiment.

The overview of this embodiment is now explained with reference to FIG. 15. Note that, in this embodiment, the same reference numeral is used for the same configuration as the first embodiment, and the explanation thereof is omitted as appropriate.

In this embodiment, the storage system 140 estimates, in response to a data write request of the data generated by the data generation source 110, the AI region of interest of the data with the AI region of interest estimator 144, sets the estimation result as an interest region of the compressor 1501 such as JPEG2000 or the like including an RoI (Region of Interest) function capable of allocating a greater code amount to a specified region (for example, interest region), compresses the data with the compressor 1501, and stores the compressed data in the storage drive 146.

The compressor 1501 is not limited to JPEG2000, and may also be an arbitrary compression algorithm having the RoI function. Otherwise, processing such as the application management table renewal processing, the AI model management table renewal processing, the AI region of interest estimation processing and the like for which explanation has been omitted is the same as the first embodiment.

Note that, in addition to expanding the data with the expander 1502 of the storage system 140 in response to the data read request, it is also possible to return the compressed data to the issue source of the data read request, such as the management terminal 120, and cause the issue source to perform expansion processing.

According to this embodiment, the compression ratio can be improved while maintaining the operable quality of the AI.

(3) Third Embodiment

In this embodiment, the storage system 140 calculates the quality based on the quality index, the quality target of the AI region of interest, and the quality target of the AI region of non-interest designated by the user via the management terminal 120. Note that, in this embodiment, the same reference numeral is used for the same configuration as the first embodiment, and the explanation thereof is omitted as appropriate.

FIG. 16 is a diagram showing an example of the AI model management table 1600 according to this embodiment.

The AI model management table 1600 comprises a quality index column 1601, an AI region of interest quality target column 1602, and an AI region of non-interest quality target column 1603 in addition to the columns of the AI model management table 141 in the first embodiment. In these fields, for example, set are the values designated by the user via the management terminal 120.

The quality index column 1601 manages the function for indexing the quality of the data for each input data name column 801. The AI region of interest quality target column 1602 manages the target value of the quality in the AI region of interest. The AI region of non-interest quality target column 1603 manages the target value of the quality in regions other than the AI region of interest.

In this embodiment, in the heat map generation processing of the AI region of interest estimation processing, the processing of merging the heat maps of a plurality of AI models (step S1206) is not performed, and the estimation result of the AI region of interest is returned for each AI model. That is, the AI region of interest estimation processing returns heat maps in a quantity that is equivalent to the number of AI models linked to the data.

Figure 17:
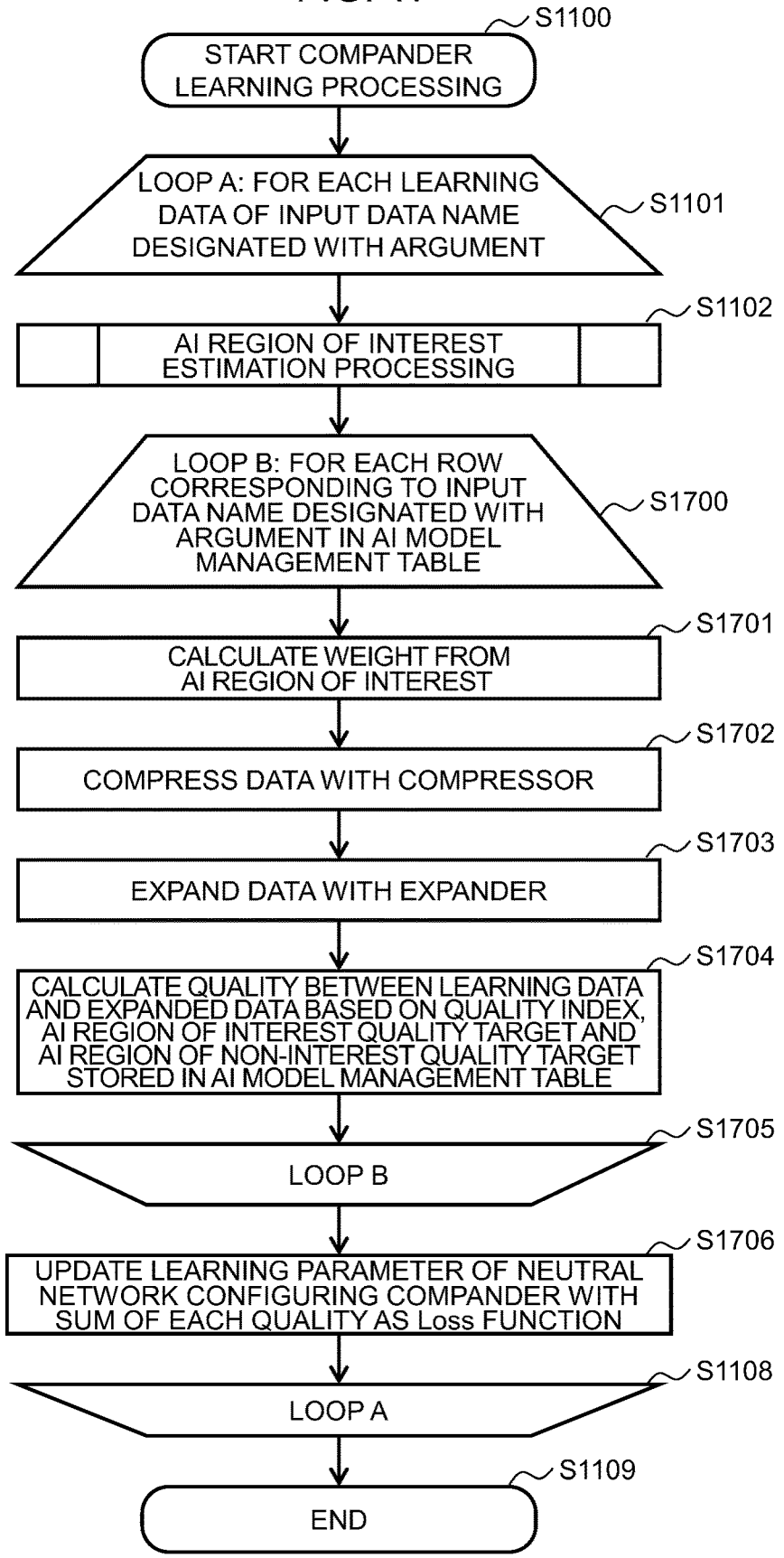
FIG. 17 is a diagram showing an example of the processing according to the third embodiment.

FIG. 17 is a diagram showing an example of the compander learning processing according to this embodiment.

Step S1700 to step S1705 are a step group that loops for each row, among the rows of the AI model management table 1600, in which the input data name designated in the argument is stored in the input data name column 801 (loop B).

In step S1701, the processor 242 selects, from the argument of step S1102, the heat map of the AI region of interest corresponding to the AI model name column 802 of the row indicated by the loop B, and calculates the weight based on the heat map. The weight can be generated, for example, based on binarization by setting "1" to the data point exceeding the threshold preset in the storage system 140 and "0" to the other data points in the heat map. The threshold and the values set after binarization may be designated by the user via the management terminal 120. Otherwise, the weight may also be calculated by applying the heat map to an arbitrary function.

Step S1702 and step S1703 are the same as step S1104 and step S1105 of the compression/expansion learning processing in the first embodiment.

In step S1704, the processor 242 calculates the quality between the learning data and the expanded data based on the values stored in the quality index column 1601, the AI region of interest quality target column 1602, and the AI region of non-interest quality target column 1603 of the rows indicated by the loop B.

The processor 242 calculates the quality, for example, by replacing the calculation formula of the mean square error in Formula (2) above with the calculation formula of the quality index designated in the quality index column 1601, replacing $t_1$ with the value designated in the AI region of interest quality target column 1602, and replacing $t_2$ with the value set in the AI region of non-interest quality target column 1603, respectively. Note that a suitable coefficient may also be set in each term configuring Formula (2) above.

The calculation method of the quality is not limited to Formula (2), and may also be an arbitrary function which calculates the scalar value with the four items of learning data, expanded data, weight, AI region of interest quality target, and AI region of non-interest quality target as the inputs.

In step S1706, the processor 242 renews the learning parameter of the neural network included in the compressor 142 and the expander 143 with the sum of the qualities calculated in step S1202 as the Loss function. For example, the processor 242 renews the learning parameter based on back propagation. The renewal algorithm of the learning parameter is not limited to back propagation, and also used may be, for example, an algorithm such as SGD, Adam or the like.

Moreover, the processor 242 may also weigh each quality with a suitable coefficient when calculating the sum of the qualities. Moreover, in addition to the weighted error calculated in step S1106, added as the Loss function may be, for example, terms representing the compression ratio, and terms for regularizing the learning parameter of the neural network configuring the compander. In the foregoing case, the value obtained by adding the respective terms representing the quality, compression ratio, regularization and the like based on a predetermined constant may be used as the Loss function, or the integrated value thereof may be used as the Loss function, or otherwise an arbitrary function which calculates one scalar value from each term may be applied and used as the Loss function.

Other than calculating the quality based on the method described above, when there is a region in which the AI regions of interest overlap regarding two AI models "AI 1", "AI 2" in which the quality index column 1601 is the same, it is also possible to calculate the quality of the overlapping region, quality of the AI region of interest of only "AI 1", quality of the AI region of interest of only "AI 2", and quality of a region that is not the AI region of interest of any AI model, respectively, and the same calculation as Formula (2) above may be performed with max $(t_{p1}, t_{p2})$, max $(t_{p1}, t_{n2})$, max $(t_{n1}, t_{p2})$, max $(t_{n1}, t_{n2})$ as the respective target values thereof. Nevertheless, $t_{p1}, t_{n1}, t_{p2}, t_{n2}$ respectively correspond to the AI region of interest quality target column 1602 of "AI 1", the AI region of non-interest quality target column 1603 of "AI 1", the AI region of interest quality target column 1602 of "AI 2", and the AI region of non-interest quality target column 1603 of "AI 2". Moreover, when the number of AI models is three or more, qualities calculated in the same manner may be used.

According to this embodiment, since the target value can be set for each data generation source and AI model, the quality demanded by each data model can be satisfied more precisely, and the compression ratio can thereby be improved.

(4) Fourth Embodiment

Figure 18:
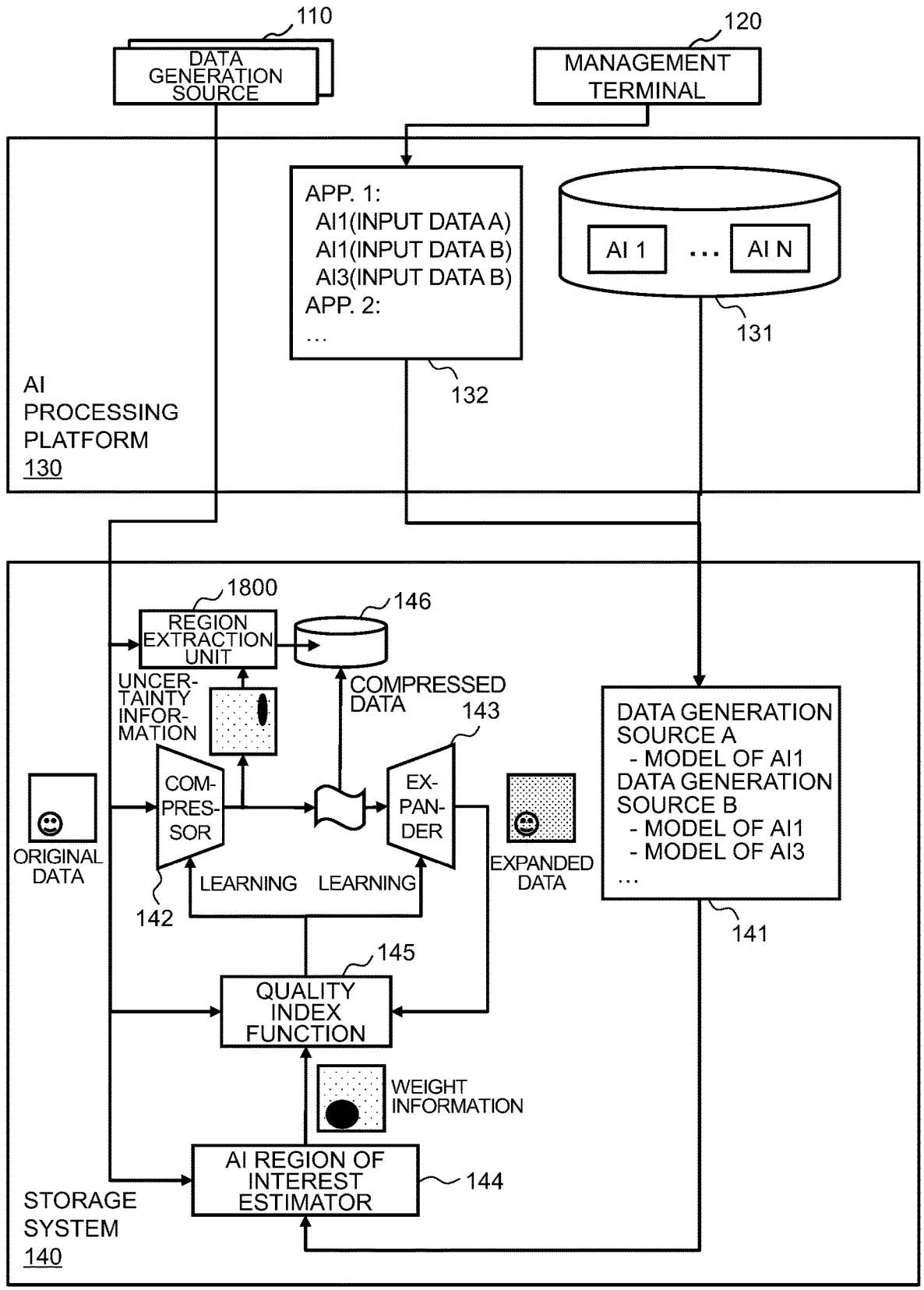
FIG. 18 is a diagram showing an example of the configuration according to the fourth embodiment.

FIG. 18 shows the overview of this embodiment. In the first embodiment to third embodiment, the compressor 142 learns to control the image quality based on the AI region of interest. This means that the compressor 142 learns to internally estimate the AI region of interest. Nevertheless, the estimation of the AI region of interest performed by the compressor 142 may include an error. In particular, normally, when there is a region determined as not being an AI region of interest despite being an AI region of interest, the quality of the region may deteriorate.

With respect to this point, in this embodiment, by using a Bayesian neural network as the neural network configuring the compressor 142, the compressor 142 learns to output an uncertainty of the estimation of the AI region of interest in each data point in addition to the compressed data. Note that, in this embodiment, the same reference numeral is used for the same configuration as the first embodiment, and the explanation thereof is omitted as appropriate.

The region extraction unit 1800 calculates the uncertainty of the estimation of the AI region of interest with the compressor 143 at the time of writing the data, extracts the original value of the data written in the region in which the uncertainty is equal to or greater than the threshold, and stores the original value of the data, together with the compressed data, in the storage drive 146. The threshold may be a value that was preset in the storage system 140, or a value designated by the user via the management terminal 120.

Other than extracting and storing the original value, it is also possible to cause a plurality of compressors having a different compression ratio and quality to learn in advance, and, when there is a region with a high uncertainty, re-compress the data with compressor of a higher quality, and store the compressed data, which was compressed by the higher quality compressor, in the storage drive 146.

At the time of reading, the compressed data read from the storage drive 146 is expanded with the expander 143, the original value is thereafter read from the storage drive 146, and, for data points that have an original value, the data obtained by replacing the expanded data with the original value is returned to the read request source.

According to this embodiment, since the original value is retained for a region in which the uncertainty is equal to or greater than the threshold and replaced at the time of reading, deterioration of quality associated with the estimation error of the AI region of interest can be avoided.

The AI processing platform and the storage system to which the present invention is applied have been explained above.

(5) Supplementary Notes

The embodiments described above include, for example, the following subject matter.

While the foregoing embodiment explained a case of applying the present invention to a data processing system, the present invention is not limited thereto, and may also be broadly applied to various other types of systems, devices, methods, and programs.

The functions of the AI processing platform (functions such as application management table renewal program 511, database program 512 and so on) may be realized, for example, by the processor 232 reading the program 237 into the RAM 233 and executing the program 237 (software), or realized with hardware such as a dedicated circuit or the like, or realized based on the combination of software and hardware. Moreover, a part of the functions of the AI processing platform may be realized with another computer capable of communicating with the AI processing platform.

The functions (functions such as AI model management table renewal program 611, compander learning program 612, AI region of interest estimation program 613, quality calculation program 614, data write program 615, data read program 616 and so on) of the storage system 140 may be realized, for example, by the processor 242 reading the program 245 into the RAM 243 and executing the program 245 (software), or realized with hardware such as a dedicated circuit or the like, or realized based on the combination of software and hardware. Moreover, a part of the functions of the storage system 140 may be realized with another computer capable of communicating with the storage system 140.

Moreover, in the foregoing embodiments, the configuration of each table is merely an example, and one table may be divided into two or more tables or all or a part of two or more tables may be one table.

Moreover, in the foregoing embodiments, while various types of data were explained in the form of XX tables and XX files for the sake of convenience of explanation, the data structure is not limited thereto, and various types of data may also be expressed as XX information or the like.

Moreover, in the foregoing explanation, information such as programs, tables, files and the like which realize the respective functions may also be stored in a memory, a storage device such as a hard disk or an SSD (Solid State Drive), or a recording medium such as an IC card, an SD card, a DVD or the like.

The embodiments described above include, for example, the following characteristic configurations.

A data processing system (for example, data processing system 100) which includes a processor (for example, processor 242) and a storage device (RAM 243, storage drive 146 or the like), and inputs/outputs data using a learned compander (for example, compressor 142 and expander 143) that compresses and expands data, wherein the data processing system comprises an estimation unit (AI region of interest estimator 144, AI region of interest estimation program 613 or the like) which uses learning data and estimates a region of interest to a data model (for example, AI model), and a learning unit (for example, compander learning program 612) which causes the compander to learn according to an evaluation function (for example, LOSS function) in which each region was weighted based on the region of interest, and a result of the corn pander compressing and expanding the learning data.

With the configuration described above, since learning is performed according to the region of interest to the data model, for example, the compression ratio of regions other than the foregoing region of interest can be increased to be higher than the compression ratio of the region of interest, and the compression ratio of the data used by the data model can be improved while maintaining the operable quality of the data model.

The learning unit causes the compander to learn by changing parameters of the corn pander based on a difference between learning data before the compression and expansion and learning data after the compression and expansion for each of the regions, and an evaluation function for each of the regions.

The data processing system further comprises a management unit (for example, AI model management table renewal program 611) which manages management information (for example, AI model management table 141) in which a generation source (for example, data generation source 110) that generates data and a data model that uses the data are associated, wherein the estimation unit identifies, for learning data of the generation source, a data model corresponding to the learning data based on the management information, and estimates a region of interest to the identified data model (for example, see FIG. 12), and the learning unit causes the compander to learn with an index which was calculated, as an evaluation function, by using the learning data, data obtained by compressing and then expanding the learning data using a compander corresponding to the generation source, and a weight of a region estimated by the estimation unit regarding the learning data (for example, see step S1106, step S1107).

The generation source is one or more subjects that generate data. For example, the generation source may be a sensor, or a device that processes data of a plurality of sensors and outputs the processed data.

With the configuration described above, since the compander is caused to learn by using, as an evaluation function, an index in which the region of interest to the data model associated with the generation source is weighted, for example, the compression ratio of the data from the generation source can be improved while maintaining the operable quality of all data models associated with the generation source. Moreover, for example, with the configuration described above, even when the region of interest to the data model is different for each data model, it is possible to identify the region of which data model the compression ratio should be controlled based on the management information.

The data processing system further comprises an interface unit (first application registration screen 300, second application registration screen 400 or the like) capable of designating a generation source (for example, data generation source 110) that generates data and a data model that uses the data, and a storage system (for example, storage system 140) configured by including an acquisition unit which has a data model (for example, AI model) and acquires a data model designated by the interface unit from a processing platform (for example, AI processing platform 130) to execute the data model, the estimation unit, and the management unit, wherein the management unit generates the management information by associating the generation source designated by the interface unit and the data model acquired by the acquisition unit (for example, see FIG. 10).

With the management information, a generation source (for example, generation source 110) that generates data, a data model (for example, AI model) that uses the data, a target value (for example, value of the AI region of interest quality target column 1602) of quality of a region of interest to the data model, and a target value (for example, value of the AI region of non-interest quality target column 1603) of quality of regions other than the region are associated, and the learning unit causes the compander to learn with an index which was calculated, as an evaluation function, by using the learning data, data obtained by compressing and then expanding the learning data using a compander corresponding to the generation source, a weight of a region estimated by the estimation unit regarding the learning data, a target value of quality of the region, and a target value of quality of regions other than the region (for example, see step S1704, step S1705).

With the configuration described above, for example, when the target value $t_1$ of the quality of the region is set to be a value that is smaller than the target value $t_2$ of the quality of regions other than the foregoing region, once an error of regions other than the foregoing region reaches $t_2$, since the decrease of said error will no longer contribute to the decrease of the evaluation function, the compander is learned to preferentially reduce the error of the foregoing region. According to the configuration described above, since the target value can be set for each generation source and data model, the quality demanded by each data model can be satisfied more precisely, and the compression ratio can thereby be improved.

The compander includes a compressor and an expander, and the data processing system further comprises a retention unit (for example, region extraction unit 1800) which calculates an uncertainty of an estimation of the region, identifies a region in which the uncertainty is equal to or greater than a threshold, and retains, as replacement data, region data in the data corresponding to the identified region or compressed data in which the data was compressed using a compressor that is of higher quality than the compressor, and a response unit (for example, data read program) which, in response to reading of the data, expands the compressed data of the data with an expander, and returns, to a request source of the data, replaced data in which expanded data has been replaced with the replacement data.

The compression unit may be provided to the storage system (for example, storage system 140), or provided outside the storage system (for example, AI processing platform 130).

With the configuration described above, for example, since the replacement data is retained in regions where the uncertainty is equal to or greater than the threshold and replaced at the time of reading, deterioration of quality in regions where the uncertainty is equal to or greater than the threshold can be avoided.

A compander (for example, compressor 1501) having a RoI (Region of Interest) function is used.

According to the configuration described above, for example, the compression ratio of the data used by the data model can be improved while maintaining the operable quality of the data model without having to cause the compander to learn.

Moreover, the foregoing configurations may be suitably changed, replaced, combined or omitted to the extent that such change, replacement, combination or omission does not exceed the subject matter of the present invention.

REFERENCE SIGNS LIST

100 . . . data processing system, 142 . . . compressor, 143 . . . expander, 144 . . . AI region of interest estimator.

The invention claimed is:

1. A data processing system which includes a processor and a storage device, and inputs/outputs data using a learned compander that compresses and expands data, wherein the data processing system comprises:
    an estimation unit which uses learning data and estimates a region of interest to a data model; and
    a learning unit which causes the compander to learn according to an evaluation function in which each region was weighted based on the region of interest, and a result of the compander compressing and expanding the learning data.

2. The data processing system according to claim 1, wherein
    the learning unit causes the compander to learn by changing parameters of the compander based on a difference between learning data before the compression and expansion and learning data after the compression and expansion for each of the regions, and an evaluation function for each of the regions.

3. The data processing system according to claim 1, further comprising:
    a management unit which manages management information in which a generation source that generates data and a data model that uses the data are associated, wherein:
    the estimation unit identifies, for learning data of the generation source, a data model corresponding to the learning data based on the management information, and estimates a region of interest to the identified data model; and
    the learning unit causes the compander to learn with an index which was calculated, as an evaluation function, by using the learning data, data obtained by compressing and then expanding the learning data using a compander corresponding to the generation source, and a weight of a region estimated by the estimation unit regarding the learning data.

4. The data processing system according to claim 3, further comprising:
    an interface unit capable of designating a generation source that generates data and a data model that uses the data; and
    a storage system configured by including an acquisition unit which has a data model and acquires a data model designated by the interface unit from a processing platform to execute the data model, the estimation unit, and the management unit,
    wherein the management unit generates the management information by associating the generation source designated by the interface unit and the data model acquired by the acquisition unit.

5. The data processing system according to claim 3, wherein:
    with the management information, a generation source that generates data, a data model that uses the data, a target value of quality of a region of interest to the data model, and a target value of quality of regions other than the region are associated; and
    the learning unit causes the compander to learn with an index which was calculated, as an evaluation function, by using the learning data, data obtained by compressing and then expanding the learning data using a compander corresponding to the generation source, a weight of a region estimated by the estimation unit regarding the learning data, a target value of quality of the region, and a target value of quality of regions other than the region.

6. The data processing system according to claim 1, wherein:
    the compander includes a compressor and an expander; and
    the data processing system further comprises:
    a retention unit which calculates an uncertainty of an estimation of the region, identifies a region in which the uncertainty is equal to or greater than a threshold, and retains, as replacement data, region data in the data corresponding to the identified region or compressed data in which the data was compressed using a compressor that is of higher quality than the compressor; and
    a response unit which, in response to reading of the data, expands the compressed data of the data with an expander, and returns, to a request source of the data, replaced data in which expanded data has been replaced with the replacement data.

7. The data processing system according to claim 1, wherein a compander having a RoI (Region of Interest) function is used.

8. A data compression method in a data processing system which includes a processor and a storage device, and inputs/outputs data using a learned compander that compresses and expands data, wherein the data processing method includes:
a step of an estimation unit using learning data and estimating a region of interest to a data model; and
a step of a learning unit causing the compander to learn according to an evaluation function in which each region was weighted based on the region of interest, and a result of the compander compressing and expanding the learning data.

* * * * *